United States Patent [19]

Jorgensen et al.

[11] Patent Number: 4,640,433
[45] Date of Patent: Feb. 3, 1987

[54] ECCENTRIC KNOCKOUTS FOR METAL BOXES

[75] Inventors: Robert W. Jorgensen, Niles, Mich.; Thomas E. Lewis; Gregory J. Kesler, both of South Bend, Ind.

[73] Assignee: Harvey Hubbell Incorporated, Orange, Conn.

[21] Appl. No.: 800,318

[22] Filed: Nov. 21, 1985

[51] Int. Cl.$^4$ .................. B65D 41/32; B65D 17/32
[52] U.S. Cl. ............................................ 220/266
[58] Field of Search ............... 220/266, 268, 3.8; 174/65

[56] References Cited

U.S. PATENT DOCUMENTS

| | | | |
|---|---|---|---|
| 1,805,003 | 5/1931 | Newman | 220/268 |
| 2,154,310 | 1/1936 | Kinnard | 175/225 |
| 2,663,454 | 12/1953 | Olson | 220/268 |
| 2,850,916 | 6/1954 | Kingdon | 74/503 |
| 3,333,501 | 9/1965 | Pitcher | 85/50 |
| 3,587,906 | 4/1969 | Pepe | 220/3.2 |
| 3,877,601 | 4/1975 | Evans et al. | 220/3.3 |

OTHER PUBLICATIONS

Photographs of Square D Panel Knockouts.

*Primary Examiner*—George T. Hall
*Attorney, Agent, or Firm*—Jerry M. Presson; Walter C. Farley

[57] ABSTRACT

A knockout structure is provided for selectively forming openings for either one of two different sizes of conduit. The center of the inner knockout is offset from the center of the outer knockout, creating an eccentric relationship which permits a positive ground to be established between the smaller conduit and the box wall by a standard lock washer when the smaller conduit is mounted therein. A secure mechanical connection is similarly established.

6 Claims, 4 Drawing Figures

ECCENTRIC KNOCKOUTS FOR METAL BOXES

This invention relates to an improved knock-out arrangement for metal electrical boxes to permit connection to the boxes of either of two sizes of conduit with a positive ground connection therebetween and to facilitate selective removal of the knockouts under normal working conditions.

BACKGROUND OF THE INVENTION

It is advantageous to produce metal boxes for electrical interconnections with knockouts of two different sizes so that the inventory of boxes can be minimized and so that a box which is already installed has the flexibility of being connectible to either of two sizes of conduit. In this context, the term "electrical box" is used to include substantially any kind of metal box designed for housing the interconnection of wires from various cables or the mounting of electrical devices. The term includes relatively large housings such as metal cabinets as well as smaller housings such as switch boxes, masonry boxes, outlet boxes, extension rings and the like. It is known to produce concentric knockouts in several ways as shown by the following patents:

U.S. Pat. No. 2,850,916, Kingdon;
U.S. Pat. No. 3,333,501, Pitcher;
U.S. Pat. No. 3,587,906, Pepe;
U.S. Pat. No. 3,877,601, Evans et al.

There are, however, problems with concentric knockouts having to do with proper grounding of the conduit to the box and also having to do with the ability of the electrician to remove the knockouts.

As to the grounding, if a box is made with concentric knockouts which are selectively removable to accommodate either $\frac{1}{2}''$ or $\frac{3}{4}''$ conduit, the knockout ring for the $\frac{3}{4}''$ conduit is about the same size as the lock nut for the $\frac{1}{2}''$ conduit. The ring is usually outwardly offset from the plane of the box wall. Thus, the lock nut engages only the ring and makes little if any contact with the box itself. Furthermore, the ring is usually attached to the box by two narrow bridging members which are not acceptable by the National Electrical Code or U.L. as being adequate grounding means between the box and conduit. It is therefore necessary to provide separate bonding jumpers between the $\frac{1}{2}''$ conduit and the box in order to satisfy safety and code grounding requirements.

The second problem arises from the same structural circumstances but is a mechanical rather than electrical problem. When a $\frac{1}{2}''$ conduit is mounted in the remaining $\frac{3}{4}''$ ring of a concentric knockout arrangement, the lock nut and conduit engage only the ring, as described above. Thus, any lateral mechanical forces exerted on the conduit are transferred directly to the ring. It is therefore necessary to use at least two bridging members between the ring and the box in order to provide mechanical stability. This, however, makes the ring extremely difficult to remove when it it necessary to attach a $\frac{3}{4}''$ conduit to the box.

For these reasons, concentric knockouts have not been acceptable, despite their apparent advantages. An eccentric knockout arrangement is shown in U.S. Pat. No. 2,154,310, Kinnard, but does not overcome the problems associated with the concentric knockouts discussed above and presents additional manufacturing problems.

SUMMARY OF THE INVENTION

Accordingly, an object of the present invention is to provide an eccentric knockout structure for an electrical box in which adequate grounding between the box and either of two sizes of conduit is achieved with the normal attachment lock nut without the need for auxiliary grounding means.

A further object is to provide an eccentric knockout structure to accommodate two different sizes of conduit with secure mechanical connections so that the knockout parts are selectively removable with reasonable ease.

Briefly described, the invention includes a knockout structure comprising a metal electrical box having a wall through which an electrical wiring passage is to be established, the wall being substantially planar and having opposite surfaces. Means in the wall defines separations along first and second substantially circular punch lines, the circles of the punch lines having centers spaced from each other along a common diameter, the second punch line being totally within and spaced from the first punch line. Together, the punch lines define a first circular knockout having opposite surfaces substantially coplanar with the opposite surfaces of the wall and a second generally annular knockout which surrounds the first knockout and has opposite surfaces which are offset from the planes containing the opposite surfaces of the wall, the second knockout having regions of maximum and minimum width on opposite sides of the first knockout along the common diameter. A first bridge member crosses the first punch line and constitutes the sole junction between the wall and the second knockout, the first bridge member being in the region of maximum width. Finally, a second bridge member crosses the second punch line and constitutes the only junction between the first and second knockouts, the second bridge member joining the second knockout at the region of maximum width so that the knockouts can be selectively removed to open a hole through which conduit of either of two sizes can be attached to establish a wire passage with the conduit securely grounded to the wall.

In order to impart full understanding of the manner in which these and other objectives are attained in accordance with the invention, a particularly advantageous embodiment thereof will be described with reference to the accompanying drawings, which form a part of this specification, and wherein.

DESCRIPTION OF PREFERRED EMBODIMENT

The invention will be described in the context of a steel box with knockouts dimensioned to accommodate solid electrical conduit of either a $\frac{1}{2}''$ inner diameter or a $\frac{3}{4}''$ inner diameter, the sizes of conduit being referred to in the trade, respectively, as $\frac{1}{2}''$ and $\frac{3}{4}''$ conduit.

Figure 1:
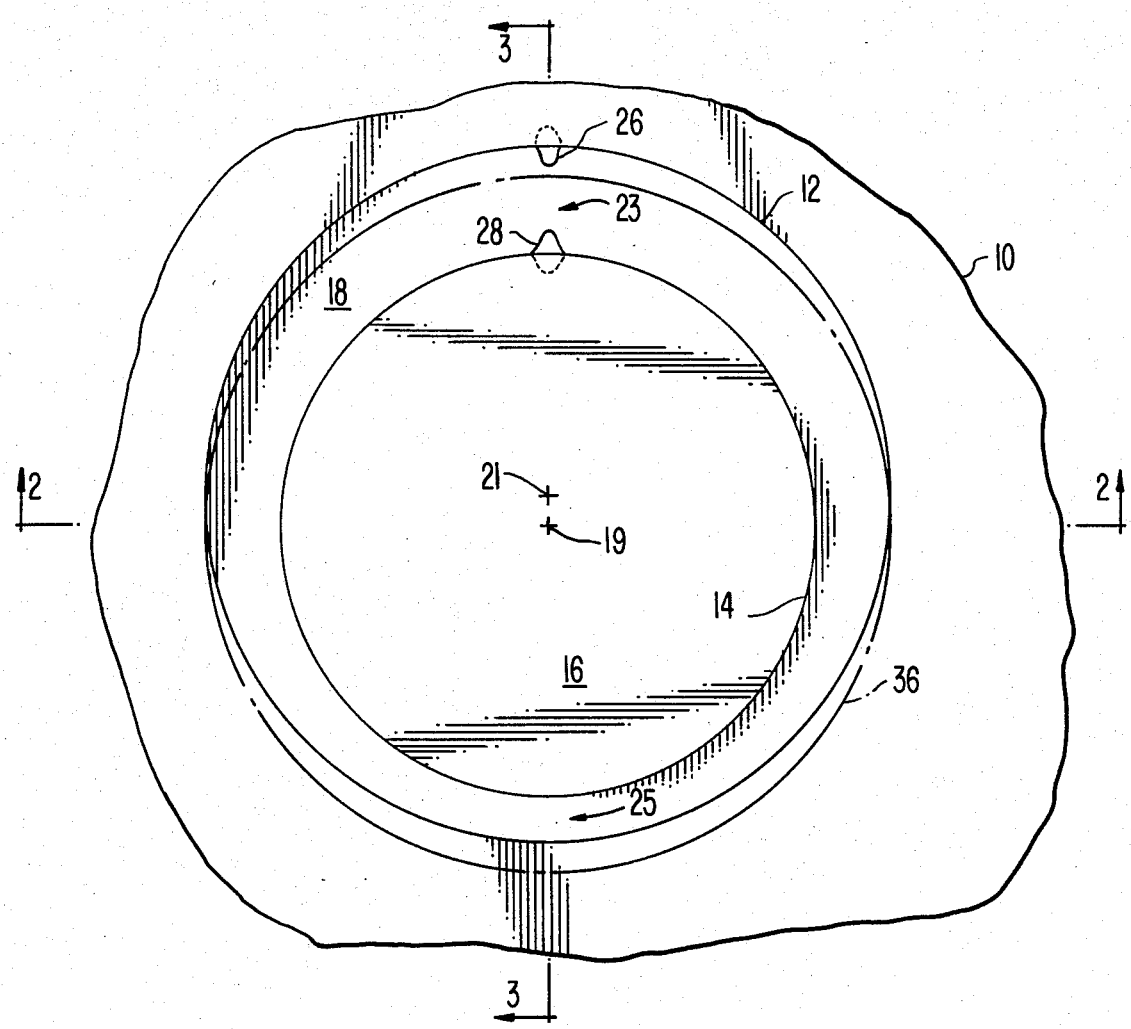
FIG. 1 is a side elevation of the inside surface of a wall of an electrical box having a knockout structure in accordance with the invention formed therein.

Referring first to FIG. 1, which is an enlarged view of the interior of a wall 10 of an electrical box, it will be seen that the knockout is defined by a first punch line 12 and a second punch line 14, both of which are preferably circular. These punch lines are formed by a punch and die arrangement of a conventional type which is used to form knockouts in sheet metal. Punch lines 12 and 14 form a first, inner circular knockout 16 and a second, ring-like knockout 18 which is generally annular.

The center 19 of knockout 16 and of punch line 14 is offset from the center 21 of punch line 12 by a distance which is determined, in part, by the size of a standard lock nut which is employed to fasten conduit to a box. In the present embodiment which is designed for ¾" and ½" conduit, the separation between the centers is 0.0495", the outer diameter of knockout 16 being 0.0860", and of knockout 18 being 1.109".

The offset of these centers produces an eccentric relationship between knockouts 16 and 18 so that a wide region indicated generally at 23 and a narrow region indicated generally at 25 are formed in knockout 18, these regions having an area of maximum width and an area of minimum width along the common diameter of the two knockouts which passes through the two centers.

Figure 2:
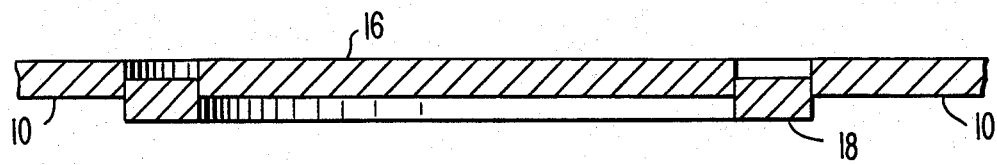
FIG. 2 is a sectional view along line 2—2 of FIG. 1.

As best seen in FIG. 2, the punching operation displaces knockout ring 18 from the box wall 10 by a distance which is substantially equal to one-half the thickness of the wall and leaves knockout 16 with its surfaces substantially coplanar with the opposite surfaces of the wall.

A first bridge member 26 extends across punch line 12 along the common diameter and a second bridge member 28 extends across punch line 14. Thus, bridge member 26 constitutes the only connection between wall 10 and knockout 18, and bridge member 28 constitutes the only connection between knockout 18 and knockout 16. While the knockouts and the wall may frictionally engage each other, the bridge members are the sole physical connections which can be relied upon to hold the knockout members in place.

Figure 3:
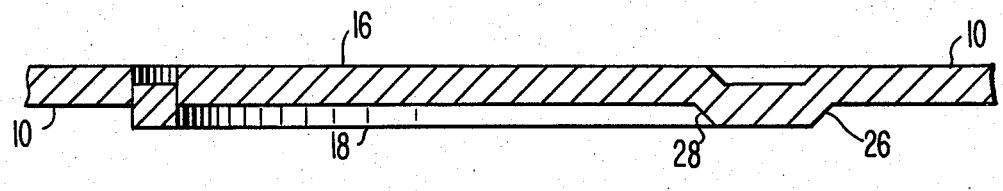
FIG. 3 is a sectional view along line 3—3 of FIG. 1.

As seen in FIG. 3, the bridge members are formed by leaving a gap in the punch and die sets used to form the punch lines, thereby allowing the metal at those gap areas to deform as knockout 18 is formed by the punch lines and offset from the plane of wall 10.

As will be readily recognized, when a ¾" conduit is to be connected to the wall, knockout 16 is removed by exerting force against the outer surface of the knockout, causing bridge member 28 to bend and break. Knockout ring 18 can then be easily pulled outwardly, since it is held by only one bridging member and since there is a relatively long lever arm between that bridging member and the opposite side of the ring by which force can be exerted on the bridge. The conduit is then inserted with the usual bushing and lock nut, or with two lock nuts where such is required, and securely attached to wall 10.

Figure 4:
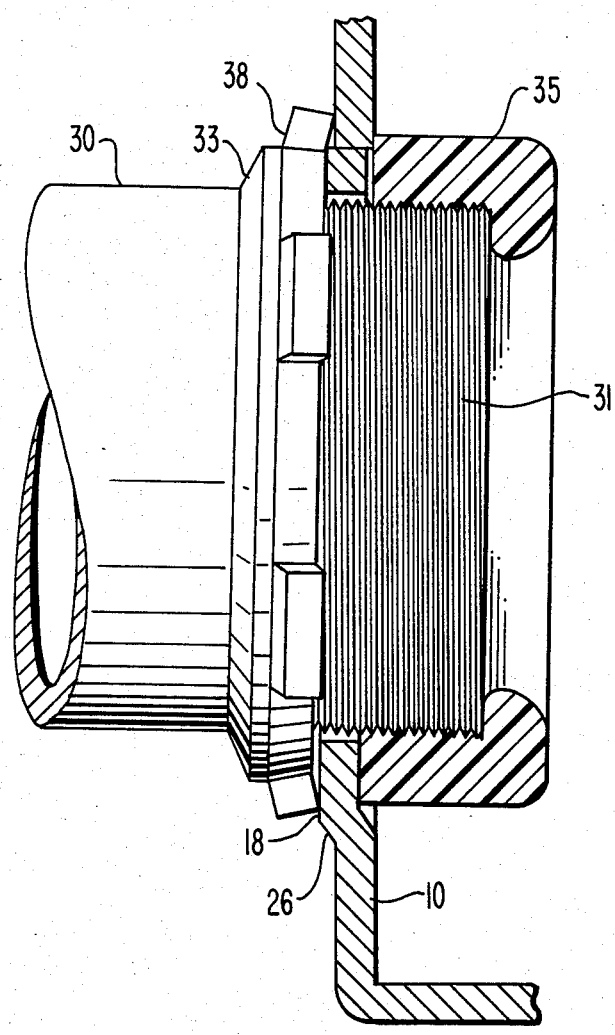
FIG. 4 is a side elevation generally along line 3—3 of FIG. 1 showing the knockout structure with the inner knockout removed and a conduit connected thereto.

The function of knockout ring 18 is, however, somewhat different from the usual knockout when a ½" conduit is to be attached. As shown in FIG. 4, a conduit 30 which has an externally threaded end 31 is provided with a lock nut 33 which is threaded onto the end 31 as far as it will go, in accordance with customary practice. Threaded end 31 is then passed through the opening formed by the removal of knockout 16 and an internally threaded bushing 35 is threaded onto the end 31 of conduit 30 until is it tight. Lock nut 33 is not flat but, rather, has teeth on the side facing wall 10 and knockout ring 18. By rotating lock nut 33 so that it moves toward and against the wall, the teeth dig into the metal of those portions of the box which are adjacent thereto, to provide a good continuous ground.

Referring again to FIG. 1 in conjunction with FIG. 4, there is shown in FIG. 1 a circle in phantom lines identified by the numeral 36 which illustrates the outer diameter of the lock nut on center 19. As will be recognized from that figure, the outer teeth of the lock nut engage the outer surface of wall 10 for an arc which extends over more than 180 degrees of the outer periphery of ring 18 as defined by punch line 12. Thus, as seen in FIG. 4, several of the teeth 38 of the lock nut extend beyond ring 18 onto the outer surface of the box, engaging that portion of the box directly between the lock nut and bushing 35. As lock nut 33 is tightened, ring 18 tends to bend inwardly, hinging slightly on bridge 26, so that a mechanical engagement is also created, holding the ring between bushing 35 and the teeth 38 of lock nut 33. This provides the solid, continuous ground connection as well as a firm, positive mechanical connection for conduit 30 as a result of the eccentricity of the opening formed by the removal of knockout 16.

It should also be mentioned that a lock nut can also be used in place of bushing 35. This technique is preferred by electricians in some circumstances and is required by codes in some areas and also with higher voltage systems. This, however, does not change the advantageous operation of the system but, instead, simply contributes further to the grounding of the conduit against the box wall directly.

One advantageous embodiment has been chosen to illustrate the invention. It will be understood by those skilled in the art that various changes and modifications can be made therein without departing from the scope of the invention as defined in the appended claims.

What is claimed is:

1. A knockout structure comprising
    a metal electrical box having a wall through which an electrical wiring passage is to be established, said wall being substantially planar and having opposite surfaces;
    means in said wall defining separations along first and second substantially circular punch lines, the circles of said punch lines having centers spaced from each other along a common diameter, said second punch line being totally within and spaced from said first punch line, said punch lines together defining
        a first circular knockout having opposite surfaces substantially coplanar with said opposite surfaces of said wall, and
        a second generally annular knockout surrounding said first knockout and having opposite surfaces offset from the planes containing said opposite surfaces of said wall, said second knockout having regions of maximum and minimum width on opposite sides of said first knockout along said diameter;
    a first bridge member crossing said first punch line and constituting the sole junction between said wall and said second knockout, said first bridge member being in said region of maximum width; and
    a second bridge member crossing said second punch line and constituting the sole junction between said first and second knockouts, said second bridge member joining said second knockout at said region of maximum width, whereby said knockouts can be selectively removed to open a hole through which conduit of either of two sizes can be attached to establish a wire passage with said conduit securely grounded to said wall.

2. A structure according to claim 1 wherein said first and second bridge members lie on said common diameter.

3. A structure according to claim 2 wherein the width of said region of maximum width along said common diameter is about 2.3 times the width of said region of minimum width along said diameter.

4. A structure according to claim 3 wherein said surfaces of said second knockout are offset from said surfaces of said wall by a distance substantially equal to one-half the thickness of said wall.

5. A structure according to claim 1 wherein said centers are spaced apart by a distance substantially equal to at least about 1/32 of the diameter of said first knockout.

6. A structure according to claim 1 wherein said centers are spaced apart a sufficient distance so that the periphery of a locknut having a diameter substantially equal to the diameter of said first punch line and positioned so that the locknut center is coaxial with the center of said second punch line lies over a portion of said wall adjacent to and outside of said first punch line over at least 180 degrees of arc.

* * * * *